Sept. 15, 1936.    A. BOUWERS ET AL    2,054,493
APPARATUS AND METHOD FOR MAKING X-RAY PICTURES
Filed Jan. 25, 1933    4 Sheets-Sheet 1

INVENTORS
ALBERT BOUWERS
WILLEM HONDIUS BOLDINGH
BY
*[signature]*
ATTORNEY

Sept. 15, 1936. A. BOUWERS ET AL 2,054,493
APPARATUS AND METHOD FOR MAKING X-RAY PICTURES
Filed Jan. 25, 1933 4 Sheets-Sheet 3

INVENTORS
ALBERT BOUWERS
WILLEM HONDIUS BOLDINGH
BY
ATTORNEY

Patented Sept. 15, 1936

2,054,493

UNITED STATES PATENT OFFICE 2,054,493

APPARATUS AND METHOD FOR MAKING X-RAY PICTURES

Albert Bouwers and Willem Hondius Boldingh, Eindhoven, Netherlands, assignors, by mesne assignments, to N. V. Philips Gloeilampenfabrieken, Eindhoven, Netherlands, a Dutch company Application January 25, 1933, Serial No. 653,538
In the Netherlands January 28, 1932

30 Claims.  (Cl. 250—34)

The present invention relates to X-ray apparatus and to methods for operating same.

To obtain sharp definition in an X-ray picture, especially in the case of pictures of moving bodies, it is important to reduce the time of exposure without increasing at the same time the size of the focus. In addition to using highly sensitive photographic material and so-called intensifying screens, the most effective means of decreasing the exposure time is by increasing the load capacity or power output of the X-ray tube.

The present invention relates to novel means to permit a very large increase of the power output of an X-ray tube and to greatly reduce the time of exposure, without increasing the dimensions of the tube or the size of the focal spot, and may be used alone or in conjunction with the previously mentioned means.

Our invention is based on the realization that it is the maximum temperature which the anticathode assumes at the focal spot—or when the tungsten insert in the copper base is very thin, the temperature of the copper engaging the tungsten insert, which determines the maximum power which it is permissible to supply to the tube, and that at any instant of the exposure, this temperature is dependent both on the instantaneous value of the power supplied to the tube, as well as on the temperature which the anticathode had previously assumed. Thus, for instance, at the beginning of the exposure the anticathode being cold, it can carry a greater load than the one admissible at a later stage of the exposure.

In referring to anticathode and target temperature hereafter, unless specifically stated otherwise, the target temperature at the focal spot is meant.

Without taking into account periodical variations due to the alternating current supply, it has been general practice heretofore—except for so-called condenser X-ray apparatus to which reference will be made later—to supply a substantially constant power to the tube during the whole exposure. Thereby, as will be more fully explained hereafter, the load or power-carrying capacity of the tube is not fully utilized.

According to the present invention, a substantially constant voltage is applied to the X-ray tube, but the current passing through the tube and thus the power supplied thereto, varies during the exposure. Thereby in the beginning, a high current passes through the tube which causes a quick rise of the anticathode temperature, preferably to substantially its maximum admissible value, thereupon the current is gradually decreased in such a way that during the entire exposure the temperature of the anticathode remains substantially constant at the above value.

According to one feature of our invention the power supplied to the tube may be so adjusted that the number of watts supplied to the tube remains substantially constant, irrespective of what the adjustment of the voltage may be. Thereby preferably the number of watts is so selected that a power is supplied to the tube corresponding to the limit of its power-carrying capacity. Under such conditions the exposure may be automatically obtained in the shortest time of exposure irrespective of the voltage applied to the tube, which voltage is to be selected in accordance with the conditions and special problems presented by the object to be photographed.

An X-ray apparatus according to our invention comprises a source of supply for the X-ray tube which provides for a substantially constant voltage and for a power which decreases during the exposure and which assumes at the end of the exposure a value which the tube can stand in continuous operation. According to our novel method it is therefore possible to supply through the tube within a given exposure time, a larger number of coulombs or milliampere-seconds than can be supplied to the tube when it is operated at constant power because in the apparatus according to our invention the number of milliamperes at the start of the exposure may be several times higher than the number of milliamperes which could be admitted with a constant power. Conversely, for a given number of milliampere-seconds the time of exposure can be considerably shortened compared with a tube operated at constant power. Thus by employing our invention either the power output of the tube may be raised and a shorter time of exposure used, or the size of the tube can be reduced.

For instance according to our invention an X-ray tube of given dimensions can be supplied with a power twice as great or even greater than would be admissible if the same power were supplied continuously. Thus considerably shorter exposures may be used, resulting in greatly increased sharpness of the picture.

In practicing our invention the most favorable results are obtained if the power supplied to the tube decreases during the exposure in such a manner that the mean temperature at the focal spot rises as quickly as possible, but not beyond the maximum admissible value, and that after such maximum value has been reached the mean temperature of the focal spot does not decrease. In referring to the mean temperature it should be understood that temperature fluctuations, due to potential pulsations, are not taken into account.

While it has already been suggested, in connection with so-called condenser apparatus, to supply to an X-ray tube a varying power, such condenser apparatus provides for an entirely different type of power-supply to the tube than does the present invention. In a condenser apparatus, a condenser is charged to a given voltage in a plurality of cycles and then abruptly discharged through the X-ray tube. Thereby the voltage applied to the tube is not constant but gradually decreases as the condenser discharges and the current passing through the tube decreases according to the decrease in voltage. Such decrease in voltage in many instances is disadvantageous as rays of different hardness are obtained which affect the quality of the X-ray picture. At the same time the changing power obtained with the condenser apparatus does not fulfill the requirements of the present invention.

Various methods may be used to obtain, at a constant voltage, a decreasing current through the tube according to our invention. For instance means may be provided which, when the X-ray tube is placed in operation, or shortly before or after the application of the operating voltage, cause a decrease in the temperature of the incandescible cathode. This reduces the electron emission and decreases the operating current through the tube. Prior to the exposure the incandescent cathode is then brought to a temperature which provides for a higher electron emission than at which the tube could normally operate. Upon application of the operating voltage the temperature of the incandescent cathode is gradually decreased in such a manner that the anode temperature after having approached its maximum allowable value remains practically constant.

Under practically any condition the best results in short-time exposure X-ray photography are obtained if the X-ray tube is loaded (supplied with power) to substantially its maximum capacity, because the exposure time can then be kept as short as possible and the focal spot as small as possible, as this leads to pictures having the best definition. This is especially pronounced in the case of pictures made of movable objects.

One particular feature of our present invention is that the voltage applied to the X-ray tube and the current passing through the tube have adjustments which are so interlocked that for each condition of voltage, the current passing through the tube is automatically so regulated that the tube can be used with the greatest efficiency. Since the current through the tube, according to our present invention, decreases during the exposure, interlocking the said adjustments causes, for a given voltage applied to the tube, the average current passing through the tube, i. e. the average value taken over the entire exposure, to be larger for a shorter exposure time than for a longer exposure time, and for a given exposure time the current to be larger for smaller operating voltages than for larger operating voltages.

The fact that the cathode heating current is not regulable at will independent of the voltage limits the possibility of using the X-ray device. It causes, for example, that no exposures can be taken with a lower energy than corresponds to the product of voltage and variable current intensity which are determined by the regulator. This difficulty may be overcome by a second regulating device which may be connected at will into the circuit instead of the former. By means thereof the current intensity of the X-ray tube can be adjusted at will, without there being any risk of an excessive load, between definite limits to an amount that does not vary during the exposure.

In case the source of supply for the operating current of the X-ray tube is not of sufficient capacity to maintain the operating voltage of the tube at a substantial constant value—due to the change in the voltage drop in the operating circuit—we provide an auxiliary device which maintains during the whole exposure the operating voltage across the tube at a value substantially constant irrespective of the operating current.

One object of our invention is therefore to provide an X-ray apparatus for the taking of short-time exposure X-ray pictures and a method of operating same by means of which sharper pictures are obtained than could be obtained with previously known apparatus and methods, except of course with X-ray tubes having a rotatable anode.

A further object of our invention is to provide an X-ray apparatus and a method of operating same, in which without increasing the dimensions of the tube and the size of the focal spot a greatly reduced exposure time can be obtained.

A still further object of our invention is to provide an X-ray apparatus and a method of operating same in which an X-ray tube, without increasing its size, can be used for a higher power output than when used in previously known manner.

A still further object of our invention is to provide an X-ray apparatus and a method of operating same, in which a variable power is supplied to the tube during the exposure, by applying thereto a substantially constant voltage and by gradually decreasing the current passing through the tube.

A still further object of our invention is to provide an X-ray apparatus and a method of operating same, in which a substantially constant voltage is applied to the tube during a short time exposure, whereby the initial current is far in excess of that which the tube could stand in continuous operation and the current is decreased during the exposure in such a way that the anticathode temperature during the whole exposure remains substantially constant and at a value approximating its maximum admissible temperature.

A still further object of our invention is a novel X-ray apparatus and a method of operating same, in which the electron emission of the cathode of the X-ray tube is raised initially above the value which would be suitable for the tube in continuous operation and the emission gradually decreased during the exposure.

A still further object of our invention is to provide an X-ray apparatus, in which the average current intensity, taken over the entire exposure depends as well on the voltage applied to the tube as on the exposure time.

A still further object of our invention is to enlarge the possibility of using an X-ray apparatus having mutually coupled adjusting means for the voltage applied to the X-ray tube and the current flowing through the tube.

Further objects of our invention will appear as the specification progresses.

In order that the invention may be clearly understood and readily carried into effect, several embodiments thereof will now be described more fully with reference to the accompanying drawings, in which.

As has been stated before, the target temperature of an X-ray tube to which a constant power is supplied during the whole exposure, gradually increases to a maximum value and this maximum temperature and the time in which it is reached depend on various factors, among others, on the physical properties, for instance, melting point, evaporation point, and heat conductivity of the materials used in the anticathode.

It is known that in any given tube the maximum power, thus voltage times current, which can be supplied continuously to the tube without damaging same is determined by the maximum specific load, i. e. the input in watts per sq. millimeter of focal spot area.

For instance, in the case of the widely used anti-cathode construction consisting of a copper anti-cathode with a tungsten insert, the maximum allowable target temperature at the focal spot is about 3000° C.—above which a marked evaporation of the tungsten takes place. In a well designed tube this target temperature occurs when the tube is supplied continuously with 200 watts per square millimeter focal spot area. In most cases this temperature is not obtained until 1 second after the beginning of the discharge of the tube. After 1 second ordinarily no appreciable rise of the anticathode temperature takes place.

A power input which causes the specific load on the focal spot to exceed 200 watts per square millimeter, is therefore not permissible in a tube which operates with a constant power supply.

In a tube operated under the above conditions the target temperature increases rapidly in the beginning and then approaches the ultimate temperature at a decreasing rate. We have realized that the anti-cathode is considerably underloaded during a large portion of the exposure and therefore the tube not fully utilized. The advantages inherent in our invention will be apparent from a consideration of the curves shown in Figures 1 and 2.

Figure 1:
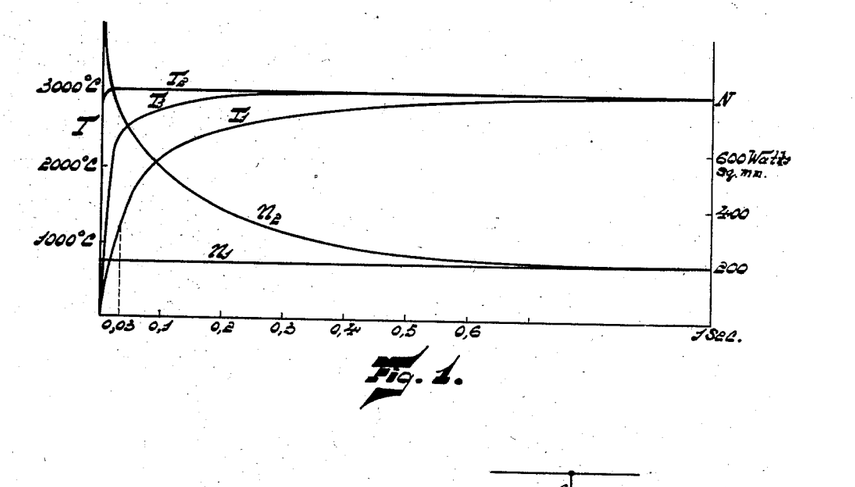
Figure 1 is a diagram showing comparative curves which represent the variations of the target temperature and of the power supplied to the tube as a function of the time, for a tube with a constant power input, as compared with a variable power input according to the invention.

The curves of Fig. 1 relate to an X-ray tube of the type above referred to, and if a constant power corresponding to a specific load of 200 watts per sq. millimeter focal spot area represented by line $n_1$ is supplied to the tube, the anti-cathode temperature at the focal spot rises according to the curve $T_1$. The maximum admissible temperature of 3000° C. is thereby reached after 1 second and is closely approximated after 0.5 second.

If a higher continuous power is supplied to the tube, the maximum temperature is reached more rapidly and we have found that, for a given time of power supply the target temperature is practically proportional to the supplied specific load. Thus, for instance, while with a specific load of 200 watts the target temperature after .03 second will be 1500° C., in the case of a specific load of 400 watts after .03 second the temperature would be 3000° C. and still rising. Thus it would be inadmissible to supply a continuous power giving a specific load of such high value to the tube.

However, if a varying power is supplied to the tube, which power is initially so high that the maximum target temperature is almost instantaneously reached and which power gradually drops according to the curve $n_2$ to a value which is admissible for continuous operation, the target assumes immediately and remains during the whole exposure at the maximum admissible temperature (see line $T_2$).

In practice such ideal conditions cannot be fully realized but a temperature rise corresponding to the curve $T_3$ can be conveniently obtained according to our invention.

Figure 2:
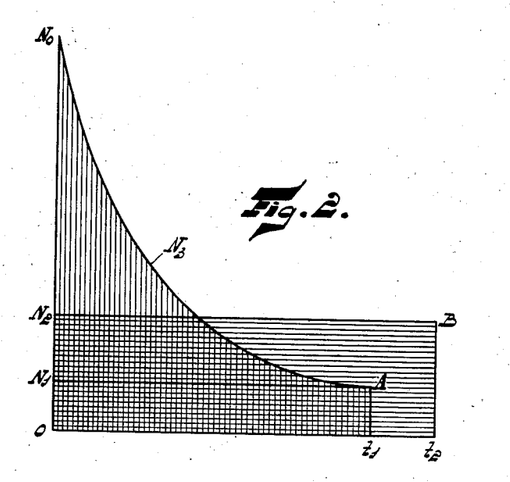
Fig. 2 is a diagram illustrating the admissible power for a given tube when supplied with a constant power input and with a varying power according to the present invention respectively.

Fig. 2 shows more clearly the important advantages obtained with our invention. When supplying a constant power of a given value $N_1$ at which power the maximum admissible target temperature is reached after $t_1$ seconds, the total power (in kilowatt seconds) supplied to the tube is represented by the area of the rectangle $N_1Ot_1A$.

On the other hand, if according to the present invention a variable power represented by the curve $N_3$ is supplied to the tube, which power is so selected as to conform to the above stated requirements, namely, that the power is initially so large that the target almost instantaneously assumes its maximum admissible temperature and the power drops to an ultimate value which is admissible as a continuous power, in such a way that, at all the intermediate powers, the anti-cathode remains at substantially its maximum admissible temperature, the total power supplied to the tube is represented by the vertically stripped area defined by the straight lines $N_0O$, $Ot_1$, and $t_1A$ and the curve $N_3$.

As appears from the drawings, the just mentioned area is several times as large as the rectangular area corresponding to the constant power $N_1$.

To obtain the same input in case of a constant continuous power, a larger X-ray tube would have to be used, the load capacity of which would have to be more than twice that of the tube adapted for a constant power $N_1$. If for example such a tube would be adapted to carry a constant power $N_2$, to obtain the same kilowatt second input the time of exposure would have to be increased to $t_2$ seconds. The area of the rectangle $N_2Bt_2O$ is thereby equal to the previously referred to area representing the input power for the smaller tube supplied according to the invention.

In accordance with the present invention it is thus possible to make within a time $t_1$ and using a tube adapted for a continuous power $N_1$, an exposure for which in case of a continuous power a tube designed for a considerably larger power $N_2$ would have to be used, and which at the same time would require a longer exposure time $t_2$.

Figure 3:
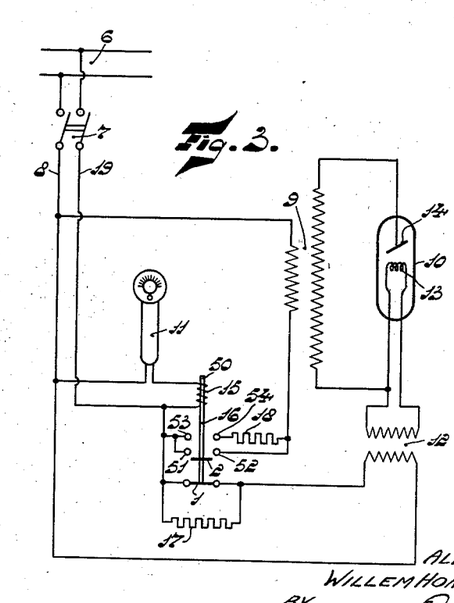
Fig. 3 is a schematic diagram of an X-ray apparatus and circuit arrangement embodying our invention, and in which the power supplied to the tube is reduced when placing the tube in operation, by decreasing the electron emission of the cathode.

Fig. 3 shows an X-ray apparatus according to our invention in which 10 represents an X-ray tube comprising an incandescent cathode 13 and an anti-cathode 14. The two ends of the cathode 13 are connected across the secondary winding of a heating transformer 12 and one end of the cathode and the anti-cathode is connected across the secondary of a high voltage transformer 9.

The alternating current is supplied from the mains 6, which are connected by means of a switch 7 to the conductors 8 and 19.

An electric time switch 11, of any suitable design, is connected in series with a coil 15 across the conductors 8 and 19. The coil 15 surrounds the magnetizable stem 50 of a switch 16 which carries two contactors 1 and 2, insulated from each other, and when the coil 15 is deenergized the switch 16 assumes the position shown in the drawings.

One side of the primary winding of the heating transformer 12 is connected to the conductor 8 and the other end of this winding is connected through a resistance 17 to the conductor 19. When the coil 15 is deenergized, the switch 16 assumes a position in which the contactor 1 short-circuits the resistance 17 and thereby places the primary winding of transformer 12 directly across the conductors 8 and 19.

The primary winding of the transformer 9 is connected with one of its ends to the conductor 8, its other end being connected to a contact 52, which together with a contact 51 cooperate with the contactor 2 of the switch 16, in such a manner that when the coil 15 is energized and the stem 50 is moved upwardly, the contacts 51 and 52 are bridged by the contactor 2, thereby connecting the other end of the primary winding of the transformer 9 to the conductor 19.

To place the apparatus in operation the switch 7 is closed. This causes immediate energization of the heating transformer, through the primary of which the current is supplied from the main 6 via conductor 8, primary winding of transformer 12, contactor 1 and conductor 19.

The transformer 12 is so dimensioned that when the voltage is thus placed directly across the two ends of its primary winding, the incandescible cathode 13 is heated to a much higher temperature than for which it is designed for continuous operation, which results in an emission current which is also greatly in excess of that for which the tube is designed for continuous operation.

Closure of time switch 11 causes energization of coil 15, whereby stem 50 is moved upwardly and contactor 1 interrupts the short-circuit across resistance 17 connected in the primary circuit of transformer 12. Upward movement of stem 50 also causes contactor 2 to bridge contacts 51 and 52 to thereby establish the primary circuit of transformer 9.

The establishing of the primary circuit of transformer 9 causes the operating voltage to be applied to the X-ray tube 10, whereas interruption of the direct connection between the primary of transformer 12 and the conductor 19 causes the current flowing through said winding to decrease as it has to pass through the resistance 17. This correspondingly cuts down the heating current of the cathode 13.

The decrease in the heating current causes a gradual decrease in the electron emission of the cathode, which is determined, besides other factors, by the initial temperature of the cathode, the value of the resistance 17 and by the heat-capacity of the cathode. These values are so selected that, during the exposure, the electron emission of the cathode decreases in such a way, that the corresponding decrease in the operating current causes the anti-cathode to remain substantially at its admissible maximum temperature during the whole exposure, whereby at the end of the exposure the operating current is reduced to a value which the tube could stand in continuous operation.

The switch 16 is here assumed to rise beyond the point required for the bridging of contacts 51 and 52 by contactor 2, whereby the contactor 2 in its further upward travel bridges contacts 53 and 54 and thereby inserts a resistance 18 in the primary circuit of the transformer 9, thus reducing thereby the E. M. F. induced in the secondary thereof.

Figure 4:
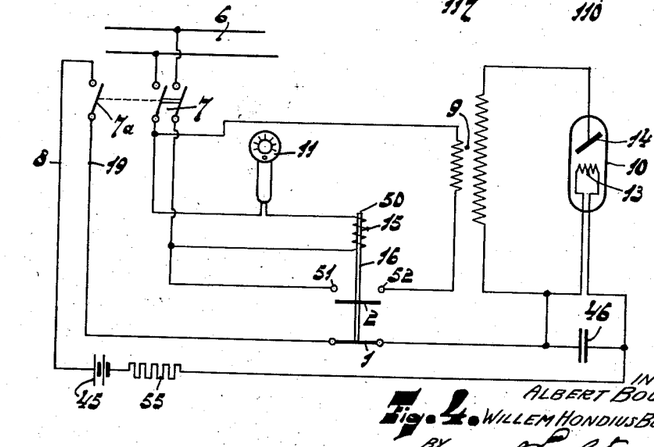
Fig. 4 is a schematic diagram showing a modification of the apparatus and circuit arrangement of Fig. 3, in which the electron emission of the cathode is varied during the exposure by controlling its temperature by the discharge current of a condenser connected across the cathode.

Fig. 4 shows a different arrangement to reduce the electron emission of the cathode, and thus to decrease the operating current during the exposure.

In the arrangement of Fig. 4, instead of using a heating transformer, the incandescent cathode is heated by direct current. For instance, we provide a battery 45, one end of which is connected directly to one end of the cathode through a current limiting resistance 55, whereas its other end is connected to the other end of the cathode via a switch 7a and the contactor 1 of the switch 16. A condenser 46 is placed across the two ends of the cathode.

The other apparatus and circuits, except for the omission of the heating transformer, are the same as in Fig. 3.

The switch 7a is preferably interlocked with the switch 7, the two switches being closed simultaneously, or if desired, in close succession.

Upon closure of the switch 7a the battery 45 is connected across the incandescent cathode and causes it to heat up. At the same time, the condenser 46 is charged up to the battery voltage.

Closure of switch 7 causes, as previously explained, action of the time switch 11, energization of the coil 15, upward movement of the switch 16, closing of contactor 2 and opening of contactor 1, which interrupts the current supply from the battery to the cathode and to the condenser. However, the charged condenser 46 being connected directly across the cathode, a closed circuit remains through which the condenser 46 gradually discharges, the discharge current passing through the cathode. The cooling off of the cathode from its initial temperature is thus slowed down and kept at the desired rate by providing a gradually decreasing current through the cathode.

The temperature to which the cathode is initially heated by the battery is greatly in excess of that which the cathode would have in continuous operation. Thus again the initial electron emission is much in excess of the normal electron emission and by properly selecting the size of the condenser the electron emission is decreased during the exposure in such a way that the power supplied to the anticathode and the temperature at the focal spot meet the requirements previously set forth.

This arrangement permits a very close approximation of the ideal conditions mentioned in connection with Fig. 1.

Figure 5:
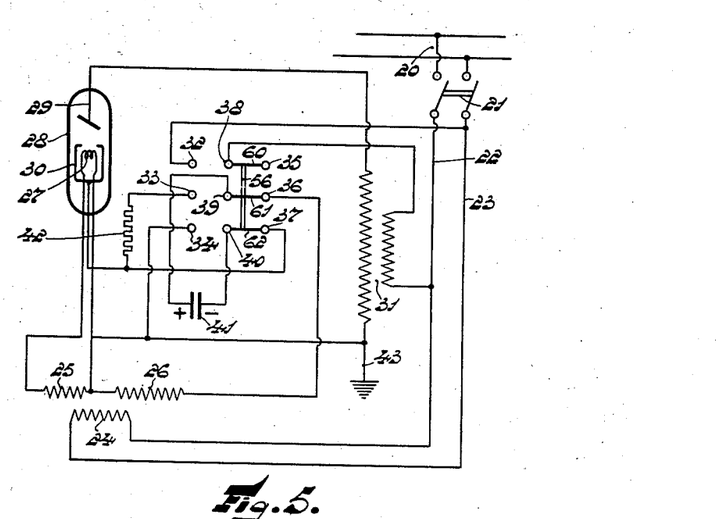
Fig. 5 is a schematic diagram of a still further embodiment of our invention in which the power supplied to the X-ray tube is varied by means of an auxiliary electrode.

Fig. 5 shows a further modification of our invention according to which the electron emission of the cathode is maintained constant during the exposure and the variation of the power supplied to the tube obtained by means of an auxiliary electrode. Thereby again the power varies in conformance with the requirement previously set forth and substantially according to the curve $N_3$ shown in Fig. 2.

The X-ray tube 28 comprises a cathode 27, an anti-cathode 29 and in addition an auxiliary electrode 30.

The heating current for the cathode is supplied by a transformer having a primary winding 24 which is connected via conductors 22 and 23 and a double pole switch 21 to the mains 20, a secondary winding 25 connected across the cathode, and a third winding 26, one end of which is permanently connected with one end of the winding 25, their connecting point being grounded at 43. The operating voltage of the tube is supplied by a high voltage transformer 31, the secondary winding of which is permanently connected across the cathode 27 and anti-cathode 29 and is grounded at 43 on the cathode side, whereas the primary winding of the transformer is connected with one side of conductor 22 and connection of the other side is controlled by a switch 56 later described.

For the control of the energization of the X-ray tube we provide a two-position three-pole switch 56, a condenser 41 and preferably also a resistance 42. The switch 56 carries three contactors 60, 61 and 62, which are insulated from each other. The switch may have the form of a double-throw switch, the contactors 60, 61 and 62 being permanently connected to heel terminals 38, 39 and 40, respectively. In the right hand position of the switch the contactors connect the heel terminals 38, 39 and 40 with terminals 35, 36 and 37, respectively, and in the left hand position of the switch with terminals 32, 33 and 34, respectively.

Before an exposure is taken the switch is in the right hand position, as shown in the drawings.

In this position of the switch 56 the free end of the primary winding of transformer 31, which is connected to terminal 38, is left open as the terminal 35 to which 38 is now connected is blank.

The condenser 41 is connected to the terminals 39 and 40; the free end of winding 26 is connected to terminal 36 and the auxiliary electrode 30 is connected to the terminal 37.

When the switch 56 is in its right hand position and thus terminals 39 and 36, and terminals 40 and 37 bridged by contactors 61 and 62, respectively, a circuit is established which can be traced as follows,—from one end of the transformer winding 26 to terminal 36, contactor 61, terminal 39, condenser 41, terminal 40, contactor 62, terminal 37, auxiliary electrode 30, cathode 27, back to the other side of transformer winding 26.

If the switch 21 is now closed voltage is applied to transformer winding 24 and thus an E. M. F. is induced in both the windings 25 and 26. The current flows through winding 25 and the cathode 27, and brings the latter to its normal electron emissive temperature, at which it remains during the whole exposure.

The E. M. F. induced in the winding 26 will cause a current flow through the above traced circuit whereby the current passes the X-ray tube between the cathode and the auxiliary electrode and also passes through the condenser 41. This current will be of a uni-directional character due to the fact that the auxiliary electrode 30 acts as an anode with respect to the cathode 27, the two thus forming the two electrodes of a rectifier. One side of the condenser thus obtains a positive charge and the other side of the condenser a negative charge, and in a plurality of cycles of the alternating current the number of which depends on the resistance of the circuit the condenser charges up to a voltage which approximates the maximum value of the alternating voltage induced in the winding 26.

To take the exposure, the switch 56 is now placed in its left hand position, thus breaking the connections between the terminals 38 and 35, 39 and 36, and 40 and 37, respectively, and establishing connections between the terminals 32 and 38, 33 and 39, and 34 and 40, respectively.

Of the three left-hand terminals of the switch 56, the terminal 32 is connected with the conductor 23, the terminal 33 is connected with the auxiliary electrode 30 through the resistance 42, and the terminal 34 is connected to that side of the cathode 27 which is connected to the common point of the windings 25, 26 and 31, and to ground.

By connecting terminals 33 and 39, and terminals 34 and 40, respectively, the auxiliary electrode 30 is given a positive potential which is equal to the voltage at which the condenser has been charged up, minus the potential drop in the resistance 42. At the same time a circuit is established which can be traced as follows, from one side of the condenser 41 to terminal 39, through contactor 61, terminal 33, resistance 42, auxiliary electrode 30, cathode 27, terminal 34, contactor 62, terminal 40, back to the other side of the condenser 41.

The current flow in the circuit just traced is provided solely by the discharge of the condenser 41, the voltage of which gradually drops during such discharge, thus providing for a gradual decreasing positive potential of the auxiliary electrode. The rate of the potential drop is determined by the size of the condenser 41 and by the value of the resistance 42, which condenser may have a capacity of the order of a few microfarads.

The connection of terminals 32 and 38 through contactor 60 causes the closure of the primary circuit of transformer 31, which thus applies the operating voltage to the tube. The current passing through the tube will be then varied in accordance with the change in the potential applied to the auxiliary electrode and decreased, according to our invention, in such a way as to obtain a variable power supplied to the tube which conforms with the requirements set forth in connection with Figs. 1 and 2.

Figure 6:
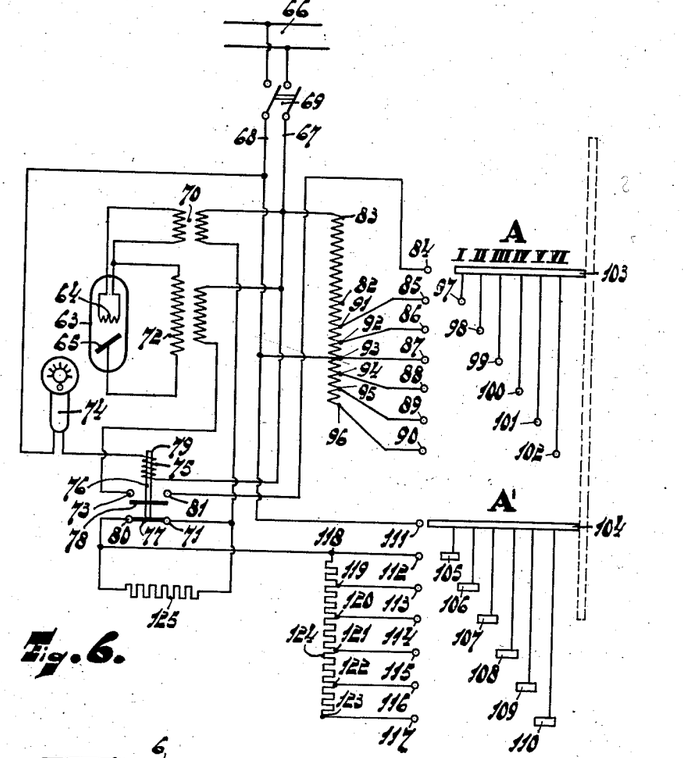
Fig. 6 is a circuit diagram of a modification of the apparatus according to Fig. 3, which is provided with adjusting means for the current intensity and for the voltage which are mutually coupled.

Fig. 6 shows an X-ray tube 63 provided with an incandescible cathode 64 and an anode 65. 66 represents the alternating current network to which conductors 67 and 68 are connected through a switch 69. For heating the cathode there is provided a low-voltage transformer 70, the secondary winding of which is connected across the cathode, whereas one end of the primary winding is connected to the conductor 67 and its other end is connected to a contact 71.

The operating voltage for the X-ray tube is supplied by a high voltage transformer 72 the secondary winding of which is connected across the cathode 64 and anode 65, whereas one end of the primary winding is connected to the conductor 67 and its other end to a contact 73.

A time-switch 74 of any suitable design is provided for adjusting the duration of the power supply to the tube and controls the energization of the coil 75 of a magnetic switch 76 in such a way that upon closure of the time switch 74 the coil 75 is energized for a time interval corresponding to the setting of the time switch.

The switch 76 comprises two contactors 77 and 78 arranged on a common member 79 forming the armature of the coil 75, the contactors 77 and 78 being electrically insulated from each other. The contactor 77 cooperates with the contact 71 and a contact 80 and bridges same, when the coil 75 is deenergized.

The contactor 78 cooperates with contact 73 and a contact 81 and bridges same, when in the energized condition of the coil 75 the member 79 is in its attracted position. A resistance 125 is connected across the contacts 71 and 80 which is short-circuited as long as contactor 77 bridges these contacts.

For the adjustment of the operating voltage and the operating current of the tube, control means, hereafter described, are provided which permit the simultaneous and corresponding adjustment of the primary voltage of the high voltage transformer 72 and of the current passing through the primary winding of the heating transformer 70.

These control means comprise two manually rotatable control cylinders A and A' provided on a common shaft and shown schematically in their development in the drawings. If desired, the two control cylinders A and A' may form a single cylinder.

The upper cylinder A controls the voltage of the transformer 72 by connecting the primary winding of the transformer with selected taps of an auto-transformer 82.

The auto-transformer 82 is provided with a plurality of taps and connected with its end 83 to the conductor 67 and thus to one end of the primary winding of transformer 72, and is connected with a tap 93 to the conductor 68. The taps 91 to 96 of the auto-transformer are connected to corresponding stationary contacts 85 to 90 which cooperate with individual contacts 97 to 102 of the cylinder A.

The contacts 97 to 102 are so staggered on the cylinder A, that in the various active positions thereof marked I to VI, one of the contacts 97 to 102 engages its corresponding contacts 84 to 90.

Aligned with the stationary contacts 85 to 90 is an additional stationary contact 84 which is connected with the contact 81 of the switch 76, and when this switch is energized and contactor 78 bridges contacts 73 and 81, it is also connected with the free end of the primary winding of transformer 72.

The stationary contact 84 cooperates with a contact strip 103 of the cylinder A which engages the contact 84 in all active positions of the cylinder A. The contacts 97 to 102 are electrically connected with the contact strip 103.

It will thus appear that depending on the position of the control cylinder A, a smaller or larger voltage will be applied to the primary winding of high-voltage transformer 72. For instance, to apply the lowest operating voltage, the cylinder A is brought in the position I, whereby when switch 69 is closed and after coil 75 through action of the time switch 74 is energized, the voltage on the primary winding of transformer 72 is obtained as follows:

Through closure of switch 69 a primary voltage is applied to the auto-transformer 82 between 83 and 93, and a secondary voltage corresponding to its portion 83 to 91 applied to the primary winding of transformer 72. The primary winding of transformer 72 is thereby connected with one end directly to terminal 83 and with its other end to the transformer tap 91 via contacts 85 and 97, strip 103, contact 84, contact 81, contactor 78 and contact 73.

The control cylinder A' which is rotated simultaneously with the control cylinder A is provided for the control of the operating current of the X-ray tube by means of varying the heating current of the cathode and may be of similar construction as the former, being provided with a contact strip 104, staggered contacts 105 to 110 electrically connected thereto.

The strip 104 cooperates with a stationary contact 111 connected to the conductor 68 and the contacts 105 to 110 cooperate with stationary contacts 112 to 117 connected on their turn to taps 118 to 123 of a resistor 124.

The contact 112 and resistor tap 118 are also connected to the contact 80 of the switch 76.

As it will be noted, by bringing the control cylinder A' into its different positions, a varying amount of resistance will be inserted in the primary winding of the heating transformer 70. The amount of resistance thus inserted, however, depends on the operating voltage applied to the tube, whereby the lower the operating voltage the less will be the resistance and thus the larger will be the heating current of the cathode, its electron emission and the operating current of the X-ray tube.

For instance, when the cylinders A and A' are brought in the position II, and thus the operating voltage is slightly in excess of the minimum operating voltage which can be applied to the X-ray tube, a comparatively small resistance corresponding to the portion 118 to 119 of the resistor 124 is inserted in the circuit of the primary winding of transformer 70, the circuit of this winding being as follows: from conductor 67 through primary winding of transformer 70, contact 71, contactor 77, contact 80, resistor tap 118, through part of resistor 124, resistor tap 119, stationary contact 113, movable contact 106, contact strip 104, contact 111 and conductor 68.

Across the contacts 80 and 71 the resistance 125 is connected, which is normally short-circuited by contactor 77. When the time-switch 74 causes energization of the coil 75, the contactor 77 is lifted and connection between contacts 80 and 71 interrupted and thus the resistor 125 is inserted in the primary winding of the transformer 70. Due to the smaller heating current the electron emission is now reduced and due to the heat capacity of the cathode this reduction in electron emission takes place gradually. By proper selection of the initial voltage applied to the cathode, the value of the resistance 125 and the heat capacity of the cathode it is possible to so reduce the temperature of the cathode, its electron emission and the operating current through the tube as to maintain, during the entire exposure time, the anti-cathode temperature at substantially constant value.

It will be noted that this decrease in the operating current takes place irrespective of what the initial value of the operating current will be, this initial value being determined by the position of the control cylinder A'.

By providing a gradually decreasing power as above described, the average value of the current passing through the tube, taken over the entire exposure times, decreases with increasing exposure times, i. e. the longer the period of duration the greater will be the difference between the initial temperature of the cathode and the temperature which it assumes at the end of the exposure.

When the voltage applied to the tube is increased the current both initially and during the further loading is decreased and the average current is also decreased with increasing exposure times.

It should be noted that the coil 75 is only energized for the time interval for which the time switch 74 is set. Thus after this time interval has elapsed the coil 75 is again deenergized, the armature 79 drops and the contactor 77 again short-circuits resistance 125.

Figure 7:
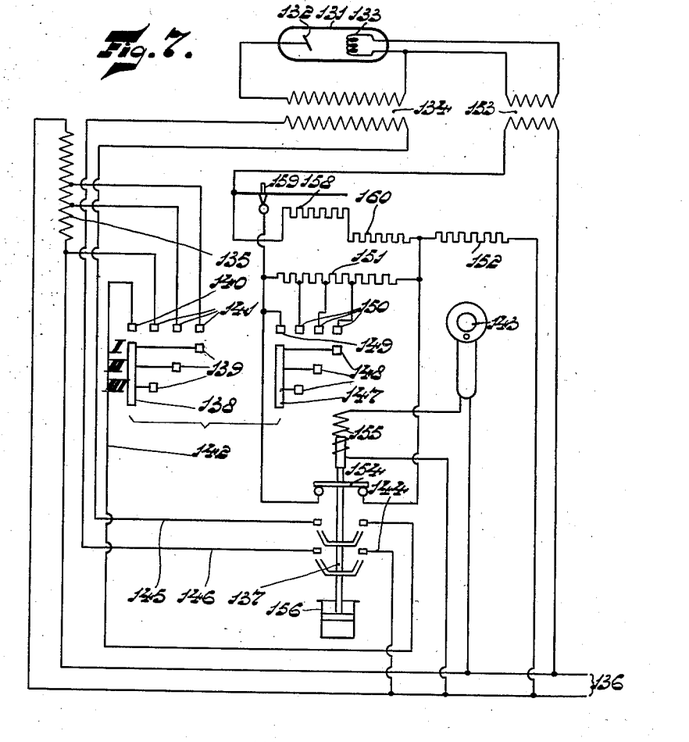
Fig. 7 is a circuit diagram of a further modification of the apparatus of Fig. 6, having a current regulating device which may be adjusted independently of the voltage applied to the tube and substituted at will for the current adjusting means which are interlocked with the voltage adjusting means.

Referring now to Figure 7, 131 designates an X-ray tube having anode 132 and an incandescible cathode 133 connected to the secondary of a high voltage transformer 134. The primary voltage of this transformer can be caused to assume three different values. For this purpose an autotransformer 135 is provided which is connected to an alternating current network 136. The transformer 134 can be connected to the transformer 135 by an electrically actuated double-pole main switch 137.

A control cylinder, provided with movable contact segments 138 and 139 and with stationary contacts 140 and 141, serves for the control of the primary voltage of the transformer 134. The control cylinder in the example illustrated permits the selection of three voltages. On being rotated from the zero position the segment 138 contacts with a fixed contact 140 and one of the segments 139 with one of the fixed contacts 141. The latter are each connected to a tap of transformer 135 so that the conductor 142 connected to the contact finger 140 can be connected to each of these three taps. If, after the cylinder is moved into one of the three positions I, II and III, the switch 137 is closed by means of the time switch 143, the primary current is supplied to the transformer 134 by the conductors 142, 144 and 145, 146.

The cylinder for the adjustment of the voltage applied to the X-ray tube has connected to it a control cylinder for the adjustment of the current for energizing the cathode of the X-ray tube. This cylinder, which as in the apparatus shown in Figure 5 may be mounted on the same shaft as the control cylinder for the adjustment of the voltage, is provided with a movable contact segment 147 and movable contacts 148 and stationary contacts 149 and 150. By rotation of the cylinder the fixed contact 149 is connected via the contact segment 147 and one of the segments 148 to one of the fixed contacts 150 and thus a portion of the resistance 151 is short-circuited.

The resistance 151 is connected in series with a current limiting resistance 152 in the primary circuit of the heating current supply transformer 153.

In the first position of the double control cylinder that tap of the transformer 135 is placed in circuit which gives the least voltage but on the contrary the largest possible part of the resistance 151 is short-circuited and thus a maximum supply current is passed through the cathode. When the cylinder is rotated further, a higher electrode voltage but a lower cathode supply current is chosen. Thus it is possible to obtain the maximum efficiency of the X-ray tube in every position of the controller.

The double-pole switch 137 has connected to it an auxiliary switch 154 that bridges the resistance 151. If by closing the time switch 143 a current is passed through the energizing coil 155 of the main switch 137, this bridging is first removed so that the cathode supplying current decreases to a value that depends on the position of the control cylinders and then the primary current of the transformer 134 is established. The latter current is maintained as long as the time switch keeps closed the circuit of the coil 155.

The main switch may be arranged so that the time between the removal of the bridging of the resistance 151 and the establishment of the primary current is regulable. In order to illustrate this diagrammatically in the drawings a dash pot 156 is represented. It may be desirable that there should be only a comparatively short interval of time because in this case the heating current has already decreased somewhat when the high tension circuit is closed and the incandescent cathode temperature at which the exposure is started is slightly different according to the voltage chosen. Nevertheless it may be better under certain conditions to remove the short-circuiting subsequent to the switching on of the high tension viz. when it is impossible to heat the incandescent cathode to such an extent that it conserves a sufficient temperature during the entire time of exposure.

A control resistance 151 alone would not provide for an independent adjustment of the initial value of the current. In order to provide for such a regulation a second regulating resistance 158 is inserted in the primary circuit of the transformer 153. A hand lever 159, which in the position illustrated establishes the connection between the primary of the transformer 153 and the resistance 151, serves for the adjustment of the resistance 158. If however the said hand lever is moved out of the position illustrated for regulating the cathode heating current by means of the resistance 158, the connection with the resistance 151 is broken and the regulating resistance 158 is substituted for the latter. The switch 154 does not bridge the resistance 158 and now opening this switch remains therefore without effect; during the exposure the current remains at the value that depends on the position of the hand lever on the resistance 158. In order to prevent the operator from establishing an excessively high cathode heating current, a special current limiting resistance 160 is still provided.

Figure 8:
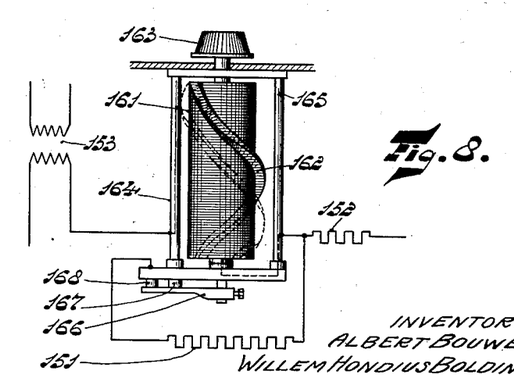
Fig. 8 is a detail view relating to the apparatus shown in Fig. 7.

Referring to Figure 8, 161 designates a cylinder on which a wire-shaped resistance is wound. The cylinder is provided with a rib 162 which follows a helical line on the surface and covers slightly less than one thread of a screw. This rib has wound on it the resistance. In this manner a helical contact path is formed. The cylinder with the resistance can be rotated by means of a knob 163. On the latter being moved out of the position shown, the rib 162 contacts with the contact rod 164. On further rotation the point of contact of the resstance with the contact rod is displaced throughout the whole length of the wire so that the knob 163 permits of connecting any desired part of the resistance between one of the ends of the wire rod 165 and the contact rod 164.

The rotary shaft of the cylinder 161 has mounted on it the lever of a switch 166. In the zero position of the regulator, the switch 166 bridges two contacts 167 and 168, the former of which is connected to the rod 164.

The regulating resistance 158 shown in Figure 7 can be formed efficiently in the shape shown in Figure 8. In this case the resistance 151 is connected between the rod 165 and the contact 168, whereas the contact rod 164 is connected to that end of the primary of the transformer 153 that is not connected directly to the alternating current supply. When the knob 163 is rotated, the connection between 167 and 168 is interrupted and thus the resistance 151 is cut out of circuit. The resistance 158 wound on the cylinder 161 is then substituted therefor. Thus a special switching-over device may be dispensed with.

While we have given specific examples of our novel apparatus and method for taking X-ray exposures to obtain higher power-inputs and shorter exposures with an X-ray tube of given dimensions than could be obtained in known manner, it should be well understood that our invention is not limited to the examples described and illustrated and that various modifications may suggest themselves without deviating from the spirit of our invention. For example, while the drawings show circuit arrangements in which alternating voltage is applied to the X-ray tube, the high voltage supply may take place through rectifiers which rectify the high tension supplied by the transformer, so that unidirectional voltage of a pulsatory or constant character is applied to the tube. Such modifications will suggest themselves to those skilled in the art and their further description is therefore omitted.

The appended claims should therefore be construed as broadly as permissible in view of the prior art.

What we believe to be new and desire to secure by Letters Patent is:

1. The method of taking radiographic exposures, comprising the steps, supplying to an X-ray tube at the beginning of the exposure a power which is more than twice that which the tube can carry continuously, and gradually decreasing said power to a value which is substantially equal to that which the tube can carry continuously.

2. The method of taking radiographic exposures, comprising the steps of supplying to an X-ray tube at the beginning of the exposure a power which is more than twice that which the tube can carry continuously, gradually decreasing said power to a value which is substantially equal to that which the tube can carry continuously, and maintaining the voltage applied to the tube at a substantially constant value during the entire exposure.

3. The method of taking radiographs with an X-ray tube having a copper anti-cathode provided with a tungsten insert, comprising the steps of initially supplying to the tube a power exceeding 400 watts per square millimeter of the focal spot area, and gradually decreasing the power to a value of approximately 200 watts per square millimeter of the focal spot area according to that time-power function which provides, during substantially the entire exposure, a focal spot temperature of approximately 3,000° C.

4. The method of taking radiographs by means of an X-ray tube having an electron emitting cathode and an anti-cathode, comprising the steps of applying to the X-ray tube an operating voltage which remains substantially constant during the whole exposure, and gradually reducing the electron emission of the cathode to correspondingly decrease the operating current of the tube.

5. The method of taking radiographs with an X-ray tube having an incandescible cathode and an anti-cathode, comprising the steps of heating up the cathode prior to the exposure to a temperature in excess of that permissible for the entire exposure time, decreasing the cathode temperature during the exposure time, and applying to the tube an operating voltage which is substantially constant during the entire exposure time.

6. The method of taking instantaneous radiographs with an X-ray tube having an incandescible cathode and an anticathode, comprising the steps of connecting the cathode to a source of current, heating up said cathode to a temperature in excess of that required for continuous operation of the tube, disconnecting said cathode from said source, connecting said cathode to a charged condenser, discharging the condenser through the cathode, and applying a substantially constant operating voltage to the tube while the condenser is discharging.

7. An X-ray apparatus for taking instantaneous radiographs comprising an X-ray tube having an incandescible cathode and an anti-cathode, a supply to furnish a substantially constant effective operating voltage across the cathode and anti-cathode, a current source for heating the cathode to an initial temperature which is in excess of that adapted for continuous operation of the tube, and means to decrease the temperature of the cathode when the operating voltage is applied to the tube.

8. An X-ray apparatus comprising an X-ray tube having an incandescible cathode and an anti-cathode, an operating circuit including said cathode and anti-cathode and a source of high voltage in said circuit, an energizing circuit for said high-voltage source comprising switching means for switching on the current therein, a supply of direct current for heating the cathode, a condenser connected in parallel with said cathode, and means interconnected with said switching means to reduce the current supply to the condenser when the current in said energizing circuit is switched on.

9. An X-ray apparatus for making instantaneous X-ray pictures comprising an X-ray tube having an incandescible cathode and an anti-cathode, a source of high voltage, a circuit including said cathode, anti-cathode and high voltage source, an energizing circuit for said high voltage source including a switch, a source of direct current for heating the cathode, a condenser placed in multiple with said cathode, and means interconnected with said switch to reduce the current flow between said source and the cathode when said energizing circuit is closed by said switch.

10. An X-ray apparatus comprising an X-ray tube having a cathode, an anti-cathode and an auxiliary electrode, a source of high voltage connected across said cathode and anticathode, an energizing circuit for said high-voltage source, and means to apply a gradually-decreasing positive potential to said auxiliary electrode when the high voltage source is connected across said cathode and anticathode.

11. An X-ray apparatus comprising an X-ray tube having a cathode, an anti-cathode and an auxiliary electrode, a high voltage supply connected between the cathode and the anti-cathode, a source of voltage for energizing said cathode, a two position switch, a condenser, a source of alternating current and a resistance, and a circuit which is established in one position of the switch, said circuit including said source of alternating current, the cathode, the auxiliary electrode and the condenser and causing the condenser to be charged to a positive potential on its side adjacent to the auxiliary electrode, and a second circuit established when the switch is in its other position, said circuit including the charged condenser, the auxiliary electrode, the cathode and the resistance, and providing gradually decreasing potential for said auxiliary electrode through the discharge of the condenser.

12. An X-ray apparatus comprising an X-ray tube having a cathode, an anti-cathode and an auxiliary electrode, a high voltage transformer having a primary winding and a secondary winding, the secondary winding being connected across said cathode and anticathode, a source of voltage for energizing said cathode, means to control the potential of said electrode including a two position switch, a resistance, a condenser and a source of supply, said switch when in one position interrupting the primary circuit of said high voltage transformer and connecting said condenser in series with said source of supply to cause the condenser to be charged up therefrom, and when in the second position closing the primary circuit of said transformer and connecting the charged condenser in series with the said resistance across the auxiliary electrode and the cathode to cause the condenser to discharge over the resistance and to cause a gradually decreasing positive potential to be applied to said auxiliary electrode.

13. The method of taking radiographs with an X-ray tube having a cathode and an anticathode, comprising the steps, applying a substantially constant operating voltage between the cathode and the anticathode, supplying through the X-ray tube a current having an initial value which exceeds that which the tube can carry during the entire exposure, and gradually decreasing the current from said initial value in accordance with that time-current function which gives during the entire exposure a substantially constant temperature at the active portion of the anticathode.

14. The method of taking radiographs with an X-ray tube having a cathode and an anticathode, comprising the steps, applying to the tube a voltage which is substantially constant during the entire exposure, passing through the tube an initial current which is greatly in excess of that which the tube can stand in continuous operation, gradually decreasing said current at a sufficiently small rate to permit the temperature of the focal spot of the anticathode to assume its maximum admissible value in a shorter time than it assumes this temperature with the maximum admissible constant power, and subsequently maintaining the focal spot substantially at this temperature until the end of the exposure, said temperature approximating the maximum permissible value for the anticathode.

15. The method of taking instantaneous radiographs with an X-ray tube having a cathode and an anticathode, comprising the steps, supplying to the tube a power of a value sufficiently high to bring the temperature of the focal spot of the anticathode practically instantaneously to its maximum admissible value, and subsequently effecting the gradual decrease of the power at a rate sufficiently small to maintain said temperature substantially constant during the entire exposure.

16. An X-ray apparatus comprising an X-ray tube having a cathode and an anticathode, said anticathode being of copper and having a tungsten insert, a power supply for said X-ray tube, a high tension circuit including said X-ray tube and said power supply and having a resistance sufficiently low to permit the tungsten insert, to be heated up abruptly to a temperature of about 3000° C., and means connected to said circuit to increase its resistance during the operation of the tube and to thereby decrease the current passing through the tube substantially according to that current-time function at which said temperature is maintained constant.

17. The method of taking instantaneous radiographs with an incandescible-cathode X-ray tube, comprising the steps, charging a condenser through the cathode and an auxiliary electrode of the tube in a plurality of cycles by means of a current rectified by said tube, applying an operating voltage of a substantially constant value across the cathode and anticathode of the tube, and causing a damped discharge of said condenser through the auxiliary electrode and the cathode of the tube.

18. An X-ray apparatus for taking instantaneous X-ray pictures, comprising an X-ray tube having an incandescible cathode and an anticathode, a source for supplying high voltage to said X-ray tube, switching means to place said high-voltage source into operation with said X-ray tube, a heating current supply for the cathode, a resistance inserted between said cathode and said supply, a contact for short-circuiting said resistance, and an interconnection between said contact and said switching means to open said contact when the high-voltage source is placed into operation with said X-ray tube.

19. An X-ray apparatus for making instantaneous X-ray pictures, comprising an X-ray tube having a cathode, an anode and an auxiliary electrode, a high-voltage supply connected between said cathode and anode, an energizing system for said cathode, a condenser, a second voltage supply, a circuit to charge up said condenser including said cathode, said auxiliary electrode, said second voltage supply and said condenser, and means to disconnect said circuit and to connect said condenser between said cathode and said auxiliary electrode so as to apply a positive potential to said auxiliary electrode when the high-voltage supply is energized.

20. An X-ray installation comprising an X-ray tube, a voltage supply therefor, a device for adjusting the voltage across the tube, a device for adjusting the time of exposure of the tube, means for automatically causing an adjustable decrease in the current passing through the X-ray tube during the exposure time, said means and voltage-adjusting device being so interconnected that the adjustment of the voltage across the tube to a higher value is always accompanied by an adjustment of the current to cause a larger percentage reduction of the current than is the percentage of voltage increase.

21. An X-ray installation for making short-time exposures, comprising an X-ray tube, a voltage supply therefor, a device for adjusting the voltage applied to the X-ray tube, a device for adjusting the exposure time, means to control the initial value of the current through the tube, and means for causing an automatic decrease of the current during the exposure, said control means being so interconnected with the voltage-adjusting device that whenever the voltage is adjusted to lower values the initial value of the current becomes higher.

22. An X-ray installation, comprising an X-ray tube having an incandescible cathode and an anode, a voltage supply for said tube, a device for adjusting the time of the exposure, a device including a variable transformer for adjusting the voltage applied across said anode and cathode, an electric system for supplying heating current to said cathode, said system comprising a variable resistor for limiting the heating current, and means for regulating said resistor, said means being so interlocked with said voltage-adjusting device that a greater resistance is included in the system as the voltage is adjusted to a higher value.

23. An X-ray installation comprising an X-ray tube having an anode and a cathode, a high-voltage supply therefor, an electric system for supplying heating current to said cathode, a device for adjusting the voltage applied across said anode and cathode, a device for adjusting the exposure time, means for providing a decrease of the current through the tube during the exposure, and means for adjusting the initial value of this current, said latter means being so interconnected with said voltage-adjusting device that the initial value to which the current is adjusted is increased with adjustment of the voltage to a lower value, the energy supplied to the X-ray tube during a given exposure time being substantially constant irrespective of the voltage adjustment.

24. An X-ray installation comprising an X-ray tube having an anode and a cathode, a high-voltage supply therefor, an electric system for supplying heating current to said cathode, a device for adjusting the voltage applied across said anode and cathode, a device for adjusting the exposure time, means for providing a decrease of the current through the tube during the exposure, and means for adjusting the initial value of this current, said latter means being so interconnected with said voltage-adjusting device that the adjusted initial value of the current is increased with adjustment of the voltage to a lower value and that the power supplied to the tube loads the tube substantially to the limit of its power-carrying capacity.

25. An X-ray installation comprising an X-ray tube having an anode and an incandescible cathode, a high-voltage supply therefor, means to adjust the voltage applied across said anode and cathode, an electric system including a current-limiting resistance for supplying heating current to said cathode, means for regulating the current in said system, switching means connected to said high-voltage supply to switch on the voltage across said anode and cathode, and a contactor to short-circuit said resistance, said contactor being interconnected with said latter means so as to be opened when the high voltage is applied to the tube, said current-regulating means being interlocked with said voltage-adjusting means to cause the initial value of the heating current to be increased with adjustment of the voltage to a lower value.

26. An X-ray installation comprising an X-ray tube having an anode and an incandescible cathode, a high-voltage supply therefor, means for adjusting the voltage applied across said anode and cathode, an electric system including a variable current-limiting resistance for supplying heating current to said cathode, means for varying said resistance, said last means being interconnected with said voltage-adjusting means to decrease the resistance as the voltage is adjusted to a higher value, a contactor to short-circuit said variable resistance, and a switching device to switch on the high voltage to the tube, said contactor being interlocked with said switching device so as to be opened when the high voltage is switched on.

27. An X-ray installation comprising an X-ray tube having an anode and an incandescible cathode, a high-voltage supply therefor, means for adjusting the voltage applied across said anode and cathode, an electric system for supplying heating current to said cathode, including a variable current-limiting resistance, a contactor to short-circuit said resistance and means to regulate said resistance, switching means including a device to adjust the exposure time of the tube for switching on and for interrupting the high voltage applied to the tube, said contactor being interlocked with said switching means so as to be opened when the high voltage is switched on, a second variable current-limiting resistance adapted to be connected at will in the said system instead of the first variable resistance, and means to regulate said second resistance independently of the voltage adjustment, said means for regulating said first resistance being interconnected with the voltage-adjusting means to insert a greater resistance in said system according as the voltage is adjusted to a higher value.

28. An X-ray installation comprising an X-ray tube having an anode and an incandescible cathode, a high-voltage supply therefor, means for adjusting the voltage applied across said anode and cathode, an electric system for supplying heating current to said cathode and including a variable current-limiting resistance, a contactor to short-circuit said resistance and means for regulating said resistance, said regulating means being interconnected with said voltage-adjusting means to insert a greater resistance in the system as the voltage is adjusted to a higher value, switching means to switch on and to interrupt the high voltage applied to the X-ray tube comprising a device to adjust the exposure time of the tube, said contactor being interlocked with said switching means so as to be opened when the high voltage is switched on, a second variable current-limiting resistance adapted to be connected in said system at will and interchangeably with said first variable resistance, and means including a manually-operated member to remove said second resistance from the system, to insert said first resistance into the system, and to regulate said second variable resistance independently of the voltage adjustment.

29. The method of taking radiographic exposures, comprising the steps, heating the cathode of an X-ray tube to an emission temperature sufficient for the passage of a high-tension operating current exceeding that which the tube can continuously carry for the duration of the exposure while preventing any substantial flow of operating current through the X-ray tube, permitting the flow through the X-ray tube of a high-tension operating current exceeding that which the tube can continuously carry for the duration of the exposure, and gradually reducing during the exposure the power supplied to the X-ray tube while maintaining the high-tension operating voltage substantially constant.

30. An X-ray apparatus comprising, an X-ray tube having a cathode and an anticathode, and an electric system comprising a source of high tension, a high-tension circuit including said X-ray tube and said source and having a sufficiently low resistance to permit said source to supply to said circuit a power which causes the temperature of the focal spot of the anticathode to abruptly attain its maximum value, a low-tension circuit for energizing said source, means for initiating the passage through said high-tension circuit for a predetermined exposure time of a current supplied by said source, and means connected with said low-tension circuit for gradually increasing the resistance of said high-tension circuit substantially in accordance with that resistance-time function at which the focal spot temperature remains constant.

ALBERT BOUWERS.
WILLEM HONDIUS BOLDINGH.